Patented Oct. 3, 1933

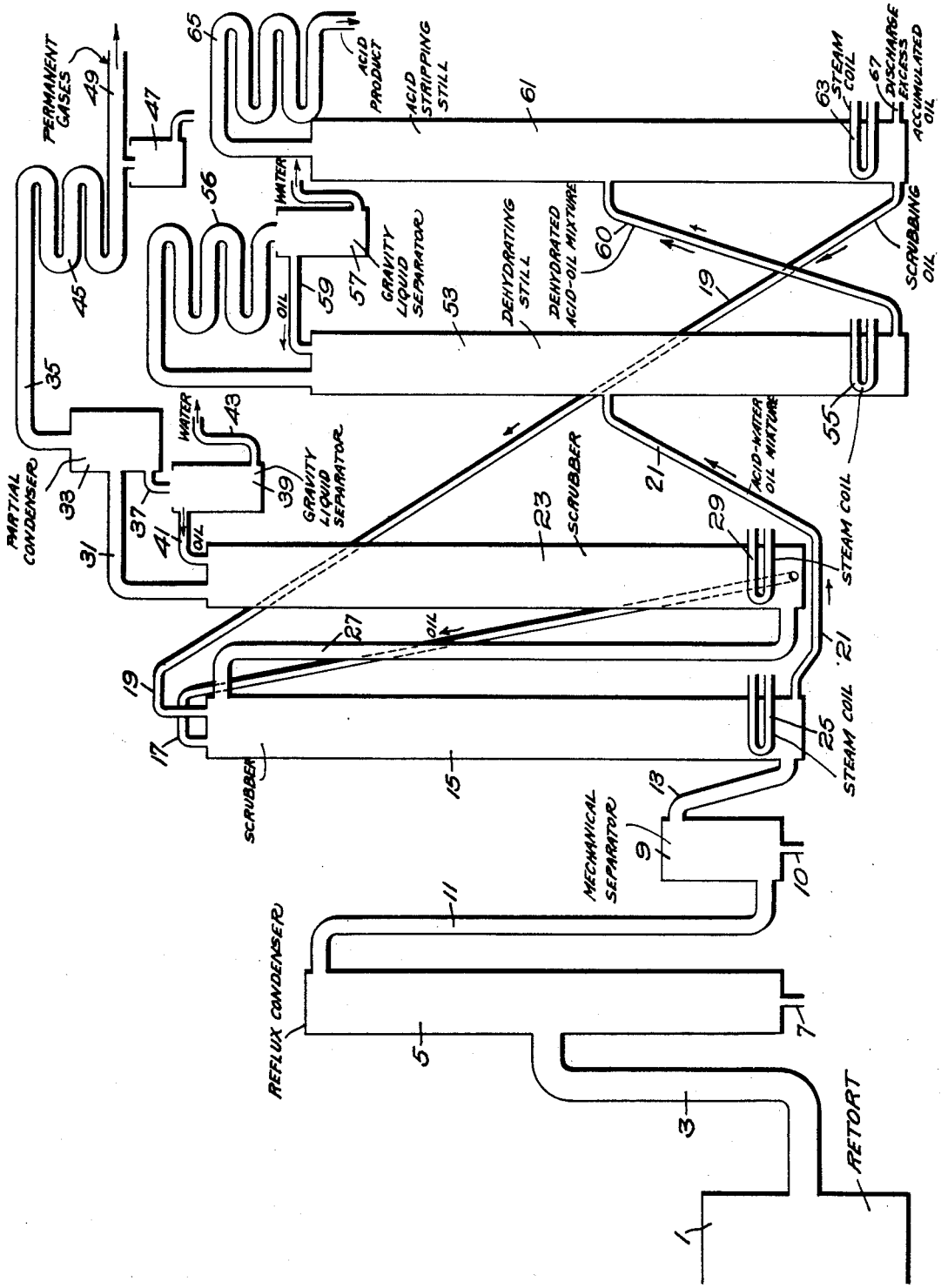

1,928,746

UNITED STATES PATENT OFFICE 1,928,746

PROCESS OF PRODUCING ACETIC ACID

William S. Wilson, Boston, Mass., assignor to Merrimac Chemical Company, Inc., Boston, Mass., a corporation of Massachusetts Application August 31, 1928. Serial No. 303,301

19 Claims. (Cl. 202—30)

The invention relates to the production of acetic acid from wood or the like and to the recovery of acetic acid and other economically valuable constituents of wood and like gases.

The invention, which has among its objects the production of concentrated acetic acid from wood gases without necessary use of substances other than those contained in said gases, will be best understood from the following description of one manner of practising the improved process.

The drawing schematically shows an example of apparatus for use in practising the improved process.

Referring to the drawing hard wood scrap or the like is fed continuously to a wood retort 1 which may be of the rotary kiln type, as for example that known as a Seaman wood retort, the charcoal being discharged from the retort as formed and the gases being discharged through a pipe 3 into suitable apparatus for treating them for recovery of concentrated acetic acid and, if desired, other economically valuable fractions such as methyl alcohol and acetic ester.

Conveniently the gaseous distillation products from the wood retort may first be treated to remove the tar. Herein for this purpose the pipe 3 discharges into a reflux condenser 5, the products entering said condenser at a temperature of say about 400° C. and discharging therefrom at say about 275° C., which will cause the heavy tars to separate and be drawn from the condenser through a discharge pipe 7 while maintaining the other constituents in gaseous form. The remaining tar, if any, existing in the form of a mist may be separated from the gases in any suitable manner, as for example by use of a centrifugal separator 9, and be drawn off by use of a pipe 10, the gases leaving the reflux condenser passing to the centrifugal separator through a pipe 11 and discharging from the separator through a pipe 13.

As shown the gases leaving the centrifugal separator through the pipe 13 discharge into a scrubber 15 in the form of a tower preferably filled with balls or other shapes formed of material, such as clay, inert with respect to the substances being treated. Wood oil recovered as a result of the process is fed to the upper portion of the tower through pipes 17 and 19, a large surface of said oil by reason of the presence of the clay balls being exposed to the ascending products fed to the tower by the pipe 13. This oil, which has a large capacity for dissolving acetic acid and a small capacity for dissolving water, in its passage down the tower dissolves a large portion of the acetic acid. The oil, containing say from 9 to 11% acetic acid and 6% dissolved water, may be drawn from the bottom of the tower through a pipe 21 and be led to a dehydrating tower hereinafter referred to. Preferably at the bottom of the tower 15 is placed a heating coil 25 for preventing condensation of water in the tower, which water if condensed would be drawn off through the pipe 21 and would contain a material fraction of the acetic acid.

Herein the bulk of the water in the form of vapor together with oil vapors, the remaining acetic acid and the gaseous constituents pass from the top of the tower 15 through a pipe 27 to the lower portion of a similar tower 23 which is provided at its bottom with a steam coil 29. The vapors passing from the top of the tower 23 through the pipe 31 are led to a partial condenser 33 which condenses the wood oil and most of the water, allowing most of the alcohol and acetic ester in a vaporous state and other vapors and gases to pass from the condenser through a pipe 35. The condensates, mostly water and wood oil, pass from the condenser through a pipe 37 into a water and oil separator 39, the oil which is lighter than the water leaving the separators through an upper discharge connection 41 and discharging into the top of the tower 23 while the water passes to waste through a pipe 43; or, if desired, the pipe 43 may lead the water to suitable apparatus for recovery of the low percentages of alcohol and ester contained therein. As only the oil escaping from the top of the column 23 is returned thereto the product is freed of the major portion of the water in said tower.

It will be understood that the wood oil, which as hereinbefore explained has a large capacity for dissolving acetic acid and a small capacity for dissolving water, forms with water a mixture which boils below the boiling point of acetic acid. Acetic acid boils at about 120° C., and the wood oil recovered by the process is such that it boils at not less than 150° C., preferably at about 180° C., while the so-called "constant boiling mixture" of wood oil and water boils at about 94° C. Consequently the steam coils 25 and 29 maintain a temperature of about 94° C. at the tops of the towers 15 and 23, and a temperature of less than 120° C., say about 100° C., at the bottoms of said towers.

It will be understood that in place of the two towers 15 and 23 a single tower may be employed, in which case the oil will be discharged into the tower at an intermediate portion of its length, say about its middle portion, resulting in the lower portion of the tower functioning as a scrubber and the entire tower functioning as a still, this single tower in other words performing the functions of the separate towers 15 and 23, and the arrangement being similar to that of the dehydrating tower hereinafter referred to.

The gases and vapors passing through the pipe 35 may be led to scrubbing apparatus (not shown) for the recovery of the alcohol and acetic ester. Herein for relieving the load on the scrubbing apparatus the gases and vapors are first passed through a condenser 45 for removing an appreciable fraction of the alcohol and ester, the condensate from the condenser being collected in a tank 47 and conveniently being treated together with the scrubbing liquor for separation of the alcohol and ester.

Preferably the wood oil containing acetic acid and some water is led through the pipe 21 from the bottom of the tower 15 to an intermediate portion of a similar tower 53. This liquor fed to the tower 53 is dehydrated by heating it, say by use of a steam coil 55, to the temperature of the constant boiling mixture of oil and water, the escaping oil and water vapors being condensed in a condenser 56 and after condensation separated by use of a separator 57 similar to the separator 39 hereinbefore referred to, while from the separator the oil is returned to the top of the tower through a pipe 59. The degree of dehydration thus secured may be varied as determined by economic considerations, and ordinarily need not be carried beyond that which will produce 90% acetic acid.

As shown the economically dehydrated wood oil and acetic acid solution is led from the bottom of the tower 53 through a pipe 60 to an intermediate portion of a final still in the form of a similar tower 61 which may be direct fired or heated by means of a high pressure steam coil 63 so as to heat the liquid to such temperature that the acetic acid will be distilled from the oil and condensed in the condenser 65 in communication with the top of the tower. Preferably the temperature at the bottom of the tower 61 should not exceed the boiling point of the oil, say 180° C., while the temperature at the top of the tower should be at least 120° C., the boiling point of acetic acid. As the dehydrated acid free oil accumulates at the bottom of the still 61 the excess over that necessary to be returned to the tower 15 may be drawn off through a pipe 67.

The vaporous products discharged by the wood retort may, for practical purposes, be considered as consisting of tar, wood oil, acetic acid, water, methyl alcohol, acetic ester, and non-condensable gases. The wood oil may be considered as a mixture of oil substances having boiling points roughly between 100° C. and 260° C. The acetic acid has a boiling point of about 120° C., and the other substances of the tar-free vapors have boiling points much below that of acetic acid.

In operation the more volatile substances of the wood oil will concentrate mostly at the top of the tower 23, and to a slight extent at the top of the tower 53, which permits the less volatile wood oil substances to be drawn from the bottoms of these towers with the dissolved acetic acid, so that substantially only the less volatile wood oil substances are treated in the still 61, from the bottom of which still such oil substantially freed of acetic acid is withdrawn and employed for scrubbing the raw tar-free vapors. As a result, there is rendered available for treating the raw tar-free vapors wood oil which has an initial boiling point of from 150° C. to 180° C., this wood oil being the condensed tar-free vapors from the wood retort with substantially all constituents of said vapors, which individually will boil below 150° C. or other desired temperature up to about 180° C., removed. Any excess accumulation of the less volatile wood oil substances may be removed by withdrawing them from the bottom of the still 61, and any excess accumulation of the more volatile wood oil substances may be removed by withdrawing them from the upper portions of the towers 23 and 53 where they collect.

Although I have described one particular way of carrying out the improved process, and one particular form of apparatus for use in connection therewith, it will be understood that within the scope of the invention wide deviations may be made from these without departing from its spirit.

I claim:

1. In a process for recovering acetic acid from tar-free vapors resulting from the destructive distillation of wood, the steps which comprise dissolving the acetic acid from said vapors with a liquid wood oil condensate mixture having an initial boiling point of from 150° C. to 180° C. and obtained from said tar-free vapors, the temperature of the wood oil during the dissolving operation not exceeding substantially 100° C.

2. The process of separating acetic acid from tar-free vapors resulting from the destructive distillation of wood, which comprises dissolving the acetic acid from said vapors with a liquid wood oil condensate mixture having an initial boiling point of from 150° C. to 180° C. and obtained from said tar-free vapors, and separating the dissolved acetic acid from said wood oil mixture, the temperature of the wood oil during the dissolving operation not exceeding substantially 100° C.

3. The process of separating acetic acid from tar-free vapors resulting from the destructive distillation of wood, which comprises dissolving the acetic acid from said vapors with a liquid wood oil condensate mixture having an initial boiling point of from 150° C. to 180° C. and obtained from vapors of substantially the same constituents as said tar-free vapors, separating the dissolved acetic acid from said wood oil mixture, and reusing said wood oil mixture for dissolving acetic acid from further tar-free vapors.

4. In a process for recovering acetic acid from a substantially continuous supply of tar-free vapors resulting from the destructive distillation of wood, the steps which comprise continuously recovering from said vapors a wood oil condensate mixture having an initial boiling point of from 150° C. to 180° C., and continuously dissolving acetic acid from said supply of tar-free vapors with said wood oil mixture.

5. In a continuous process for recovering acetic acid from a substantially continuous supply of tar-free vapors resulting from the destructive distillation of wood, the steps which comprises continuously recovering from said vapors a wood oil condensate mixture having an initial boiling point of from 150° C. to 180° C., continuously dissolving acetic acid from said supply of tar-free vapors with said wood oil mixture, separating the dissolved acetic acid from said wood oil mixture, and reusing said wood oil mixture for dissolving acetic acid from further tar-free vapors of said supply.

6. The process of recovering acetic acid from tar-free vapors resulting from the destructive distillation of wood, which comprises dissolving acetic acid from said vapors with a wood oil condensate mixture having an initial boiling point of from 150° C. to 180° C. the temperature of the wood oil during the dissolving operation not exceeding substantially 100° C.

7. The process of separating acetic acid from tar-free vapors resulting from the destructive distillation of wood, which comprises dissolving the acetic acid from said vapors with a liquid wood oil condensate mixture having an initial boiling point of from 150° C. to 180° C. and obtained from vapors of substantially the same constituents as said tar-free vapors, dehydrating said wood oil mixture with the acetic acid dissolved therein, and subjecting the dehydrated solution to distillation for driving off the acetic acid.

8. The process of separating acetic acid from tar-free vapors resulting from the destructive distillation of wood, which comprises dissolving the acetic acid from said vapors with a liquid wood oil condensate mixture having an initial boiling point of from 150° C. to 180° C. and obtained from vapors of substantially the same constituents as said tar-free vapors, dehydrating said wood oil mixture with the acetic acid dissolved therein, subjecting the dehydrated solution to distillation for driving off the acetic acid, and reusing the dehydrated, substantially acetic acid-free wood oil mixture for dissolving acetic acid from further tar-free vapors.

9. In a process of separating acetic acid from tar-free vapors resulting from the destructive distillation of wood, the steps which comprise dissolving the acetic acid from said vapors with a liquid wood oil condensate mixture having an initial boiling point of from 150° C. to 180° C. and obtained from vapors of substantially the same constituents as said tar-free vapors, dehydrating the solution of acetic acid and wood oil mixture by distilling off the constant boiling mixture of said wood oil mixture and water, separating the wood oil and water of the distillate, and returning the separated wood oil to the solution.

10. The process of separating acetic acid from tar-free vapors resulting from the destructive distillation of wood, which comprises dissolving the acetic acid from said vapors with a liquid wood oil condensate mixture having an initial boiling point of from 150° C. to 180° C. and obtained from vapors of substantially the same constituents as said tar-free vapors, dehydrating the solution of acetic acid and wood oil mixture by distilling off the constant boiling mixture of said wood oil mixture and water, separating the wood oil and water of the distillate, returning the separated wood oil to the solution, distilling the acetic acid from the dehydrated solution, and reusing the dehydrated, substantially acetic acid-free wood oil mixture for dissolving acetic acid from further tar-free vapors.

11. The process of separating acetic acid from vapors resulting from the destructive distillation of wood, which vapors have been freed from tar, that consists in scrubbing said vapors with a liquid wood oil condensate mixture having an initial boiling point of from 150° C. to 180° C., subjecting the wood oil mixture containing acetic acid dissolved therein to fractional distillation for separating the highly volatile constituents therefrom, treating the resulting wood oil mixture to separate concentrated acetic acid from the wood oil mixture, and reusing the latter for scrubbing tar-free vapors.

12. The process of separating acetic acid from tar-free vapors resulting from the destructive distillation of wood, which consists in scrubbing said vapors with a liquid wood oil condensate mixture having an initial boiling point of from 150° C. to 180° C., thereafter distilling off the constant boiling mixture of said wood oil mixture and water from the scrubbing liquor, separating the wood oil mixture and water of the distillate and reusing the separated wood oil mixture for scrubbing the vapors, and freeing the acetic acid from the remaining liquor.

13. The process of separating acetic acid from vapors of the destructive distillation of wood, which vapors have previously been treated to remove the tar, that consists in scrubbing said vapors with a liquid wood oil condensate mixture having an initial boiling point of from 150° C. to 180° C., subjecting the resulting wood oil liquor to fractional distillation at the constant boiling point of said wood oil mixture mixed with water in order to remove the highly volatile constituents, thereby dehydrating the resulting acid, water and oil mixture, recovering the acetic acid by distillation from the dehydrated liquor, and reusing the dehydrated, substantially acetic acid-free liquor in scrubbing additional tar free vapors.

14. The continuous process of separating acetic acid from a continuous supply of tar-free vapors resulting from the destructive distillation of wood, which comprises recovering from said vapors a liquid wood oil condensate mixture having an initial boiling point of from 150° C. to 180° C., scrubbing tar-free vapors of said supply with said wood oil mixture, dehydrating the scrubbing liquor by distillation at the constant boiling temperature of said wood oil mixture mixed with water, distilling the acetic acid from the dehydrated liquor, and reusing the dehydrated, substantially acetic acid-free liquor for scrubbing further of the tar-free vapors of said supply.

15. In a process for separating acetic acid from tar-free vapors resulting from the destructive distillation of wood, the steps which comprise scrubbing said vapors with a liquid wood oil condensate mixture having an initial boiling point of 150° C. to 180° C. while maintaining the temperature of the oil during the scrubbing operation not substantially above 100° C., and thereafter separating the dissolved acid from the oil.

16. In a process for separating acetic acid from tar-free vapors resulting from the destructive distillation of wood, the steps which comprise scrubbing said vapors with a liquid wood oil condensate mixture having an initial boiling point of 150° C. to 180° C. while maintaining the temperature of the oil during the scrubbing operation not substantially above 100° C., thereafter dehydrating the oil and finally separating the dissolved acid from the dehydrated oil.

17. In a process for separating acetic acid from vapors resulting from the destructive distillation of wood from which wood oil and tar-like materials have been separated, the steps which comprise scrubbing of vapors with a liquid wood-oil condensate mixture, while maintaining the temperature of the oil during the scrubbing operation not substantially above 100° C., subjecting such oil containing the dissolved acetic acid and water to dehydration without volatilizing substantial proportions of the acetic acid dissolved therein, thereafter separating the acetic acid from the dehydrated oil by volatilization, and returning the resulting oil for use in the scrubbing operation.

18. The method as defined in claim 17 and further characterized in that the liquid wood oil mixture has an initial boiling point of approximately 150°–180° C.

19. The method as defined in claim 17 and further characterized in that the wood oil scrubbed vapors are condensed, whereby an aqueous layer and a wood oil layer are obtained and the wood oil layer is returned to the scrubbing system.

WILLIAM S. WILSON.